United States Patent Office 2,953,498
Patented Sept. 20, 1960

2,953,498

ALCOHOLIC POLYVINYLIMIDAZOLE AEROSOL HAIR PREPARATION

Jesse Werner, Holliswood, N.Y., assignor to General Aniline & Film Corporation, New York, N.Y., a corporation of Delaware No Drawing. Filed Nov. 28, 1958, Ser. No. 776,680

5 Claims. (Cl. 167—87.1)

The present invention relates to an improved hair grooming composition.

It is known that several natural gums and resins have been replaced by synthetic polymers and copolymers in the preparation of hair waving and setting compositions. The disadvantages of the natural gums and resins were that they dried hard and imparted undesirable stiffness and brittleness. To overcome these shortcomings, it has been proposed to use water soluble synthetic polymers such as those obtained by the incomplete saponification or hydrolysis of polymeric acrylic and $\alpha$-$\gamma$-acrylic esters and amides. The disadvantage of waving fluid or hair dressing preparation containing such polymers is that the preparation cannot tolerate bleaching agents without the presence of ammonia, or an ammonium salt, such as ammonium carbonate. The latter compounds have the tendency to impart hygroscopicity to the polymeric film or coating after evaporation of the liquid medium or carrier. As a result, the film or coating becomes tacky and develops a greasy feel. Moreover, depending upon the nature of the water soluble polymeric acrylic acid derivative, some derivatives have the tendency of rubbing loose and falling off the air in the form of small flakes resembling dandruff, while others require alkaline media for removal from the hair.

Alcoholic solutions of shellac have also been employed and sold in limited amounts in an aerosol system. The disadvantage of shellac is that it must be solubilized with alkaline media in order to make it soluble in alcohol and in the aerosol propellant. In addition an alkaline medium must also be employed to remove it from the hair after application.

The principal synthetic polymers and copolymers presently employed consist of polymers of polyvinyl pyrrolidone and copolymers thereof with other polymerizable vinyl monomers. The polymer of polyvinyl pyrrolidone is outstanding and currently employed in aerosol hair grooming preparations. When a polyvinyl pyrrolidone alcohol solution is applied in an aerosol system to human hair under a relatively humidity of less than 50%, the tendency of the resulting film to tackiness is substantially decreased. As a result thereof the preparation is acceptable by all consumers. However, when the relative humidity is above 50%, and particularly at humid atmospheres, films of polyvinyl pyrrolidone, sprayed from an aerosol system, pick up considerable moisture. The moisture is retained and results in a tacky film. In view of this property, the aerosol preparation is extremely undesirable where a dry hair condition is required as is the case with most women. The equilibrium water content of polyvinyl pyrrolidone depends upon the relative humidity of the atmosphere. The moisture content varies in a linear fashion with relative humidity, and the equilibrium percentage of moisture is about one-third of the relative humidity. Thus, if polyvinyl pyrrolidone is exposed to a relative humidity of 50%, the resulting film contains about 17% moisture. To overcome the unique hygroscopicity of polyvinyl pyrrolidone, it has been suggested to employ detackifying agents such as shellac, cellulose acetatepropionate, etc. The former yields films which become opaque at high humidities, and the latter yields a film insoluble in ethyl alcohol. Carboxy-methylcellulose, celluose acetate, methyl methacrylate polymer, polyvinyl formal, etc., are not effective as detackifiers under conditions of extremely high humidities.

Copolymers of vinylpyrrolidone, i.e. those prepared by the polymerization of 30 to 70% of vinylpyrrolidone and 70 to 30% of a vinyl monomer, such as vinyl acetate, and the like, while somewhat less tacky than polyvinylpyrrolidone, nevertheless possess sufficient tackiness to meet objections by women users.

It is an object of the present invention to provide an improved hair grooming composition which does not require the employment of detackifying agents, plasticizers and the like and which is substantially tack-free at relative humidities of 50–90%.

Other objects and advantages will become more clearly evident from the following description.

I have found that polyvinyl imidazole having a molecular weight of at least 20,000 to 400,000 lends itself uniquely to the preparation of hair grooming compositions without any of the shortcomings of natural gums and resins, synthetic polymers and copolymers of vinyl pyrrolidone. The polyvinyl imidazole is not only soluble in alcohol and water but alcohol solutions thereof are compatible with practically all of the currently employed aerosol propellants and mixtures thereof. In addition, polyvinyl imidazole is soluble in trifluoroethyl chloride. In view of this solubility, the preparation of an alcoholic solution is not necessary to prepare a sprayable hair grooming composition which will be tack-free at conditions of relative humidity from 50–90%.

To demonstrate the uniqueness of polyvinyl imidazole as to its lack of tackiness when compared with the commercial preparations containing polyvinyl pyrrolidone, copolymers thereof, and a mixture of polyvinylpyrrolidone and polyvinyl imidazole, a 5% solution in anhydrous alcohol was prepared of each and films cast on a glass plate and dried at 72° F. and a relative humidity of 90%. After drying, the films were tested for tackiness using polyvinyl pyrrolidone films as standard with an arbitrary rating of 100. The results obtained as as follows:

| Sample No.: | Rating |
|---|---|
| (1) Polyvinyl pyrrolidone (M.W. 30,000) | 100 |
| (2) Copolymer of 70% vinyl pyrrolidone and 30% vinyl acetate | 100 |
| (3) Copolymer of 50% vinyl pyrrolidone and 50% vinyl acetate (M.W. 32,000) | 88 |
| (4) Copolymer of 30% vinyl pyrrolidone and 70% vinyl acetate (M.W. 31,500) | 75 |
| (5) Mixture of 70% polyvinyl pyrrolidone (M.W. 30,000) and 30% polyvinyl imidazole (M.W. 30,000) | 62 |
| (6) Mixture of 50% polyvinyl pyrrolidone (M.W. 30,000) and 50% polyvinyl imidazole (M.W. 30,000) | 50 |
| (7) Mixture of 30% polyvinyl pyrrolidone (M.W. 30,000) and 70% polyvinyl imidazole (M.W. 30,000) | 38 |
| (8) Polyvinyl imidazole (M.W. 30,000) | 0 |

The foregoing results were obtained by the following test:

Individual films were cast on polished glass plates and conditioned for 2 hours at 72° F. and 90% relative humidity. A piece of aluminum foil was lightly deposited on top of each film and a rigid piece of aluminum plate 1″ x 3″ x ⅛″ weighing 17 grams placed on top of the aluminum foil. After 2 minutes, the aluminum plate was removed and the glass panel inverted. If the aluminum foil fell off, the procedure was repeated adding weights on top of the aluminum plate until such time as the aluminum foil stuck to the film on inversion.

The number of grams required to obtain adhesion of the foil to the film were as follows:

| Sample No.: | Grams |
|---|---|
| 1 | 0 |
| 2 | 0 |
| 3 | 5 |
| 4 | 10 |
| 5 | 15 |
| 6 | 20 |
| 7 | 25 |
| 8 | 40 |

Considering sample No. 8 to have zero tackiness and samples 1 and 2 to have a tackiness of 100, the tackiness of samples 3 to 7 inclusive, is expressed in percent in accordance with the following calculation:

| Sample No. | Calculation | Percent Tack |
|---|---|---|
| 3 | 40-5/40 | 88 |
| 4 | 40-10/40 | 75 |
| 5 | 40-15/40 | 62 |
| 6 | 40-20/40 | 50 |
| 7 | 40-25/40 | 38 |
| 8 | 40-40/40 | 0 |

From the foregoing results, it is clearly manifest that polyvinyl imidazole is unique in that its hygroscopicity at 90% of relative humidity is nil. The other new and unexpected feature is that films of polyvinyl imidazole do not flake off and do not impart an undesirable stiffness and brittleness. As a matter of fact the films are flexible, glossy and readily removed by a simple soap and water washing.

The polyvinyl imidazole possessing the new and unexpected properties is characterized by the following general formula:

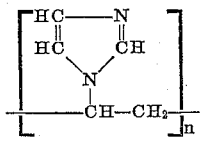

wherein $n$ represents the extent of polymerization and is indicative of the molecular weight which ranges from 20,000 to 400,000.

Films of polyvinyl imidazole whether cast from an alcohol solution, alcohol-propellant system or from trifluoroethyl chloride have excellent pliability, elasticity and do not become tacky even in the higher humid ranges. Whether cast from an alcohol solution, an alcohol-propellant system or from trifluoroethyl chloride, the polyvinyl imidazole will always yield to the hair a well groomed appearance. The film imparts a durable, pliable and elastic coating which gives body to the hair.

The polyvinyl imidazole which I found useful in the preparation of hair grooming compositions of the present invention is prepared by vinylating imidazole and polymerizing it in the presence of peroxides (see Reppe, Ann. 601, 81–138 (1956)). The molecular weight of the polymers which are formed can be varied over a wide range by the choice of suitable reaction conditions, as is well known to those skilled in the art of polymerization. Polymers having a molecular weight as low as 1000 and as high as 400,000 can be formed. For purposes of the present invention, polymers which have a molecular range between 20,000 to 400,000 can be employed with a preferred molecular weight between 20,000 and 100,000.

The concentration of the polyvinyl imidazole may range from 1 to 3 parts by weight of either alcohol, trifluoroethyl chloride or a mixture of an anhydrous alcohol and a propellant consisting of 25 to 35 parts of anhydrous alcohol, such as methanol, ethanol, n- or iso-propanol and 62 to 74 parts of a propellant or a mixture of propellants.

As propellants "Freon"–11, 12, 21, 113, 114 and 115 may be employed alone or in admixture to give the desired propellancy. I prefer however, to employ a mixture of 20–25% of "Freon"–11 and 75–80% of "Freon"–12. In lieu thereof a mixture of 60% "Freon"–114 and 40% of "Freon"–12 may also be employed.

Other materials which are not essential to the hair grooming preparation may include small amounts of perfuming agent, dandruff medicament and the like.

Instead of employing the polyvinyl imidazole in the form of a spray, it may also be employed from an alcohol solution especially in hair waving.

The preparation of suitable hair grooming compositions will be described in greater length in connection with the following examples. It is to be understood however, that these examples are merely illustrative and are not intended to limit the scope of the invention claimed herein. All parts given are by weight.

*Example I*

2 parts by weight of polyvinyl imidazole having a molecular weight of 20,000 was dissolved in 97.99 parts of anhydrous ethyl alcohol. To the alcoholic solution was added 0.01 part by weight of a synthetic lilac perfuming agent. The solution was stirred and bottled in 4, 8 and 16 ounce sizes. The alcoholic solution is particularly adaptable for producing artificial hair waves. It is applied to the hair by rubbing on the scalp or by moistening the hair with the alcoholic solution or by atomizing the alcoholic solution into the hair. After the hair is dry, it may be combed with a moist comb and after drying the hair will immediately reset. A simple water washing will remove the film.

*Example II*

Into a metal aerosol can partially immersed in a solid carbon dioxide/acetone bath was condensed 97.5 parts of trifluoroethyl chloride. To this was added 2.5 parts by weight of polyvinyl imidazole having a molecular weight of 100,000. The nozzle assembly was appropriately affixed and the can sealed in a brass cage. The can was checked for leaks and submerged in water and then allowed to warm to room temperature. Upon spraying on the human hair it imparted a durable coating that was unusually pliable and elastic and gave a high gloss to the hair.

*Example III*

Into a metal aerosol can, partially submerged in a Dry Ice and acetone bath, were condensed 40 grams of "Freon"–12 and 28.5 grams of "Freon"–11. To this was added 1.5 grams of polyvinyl imidazole, molecular weight approximately 60,000, dissolved in 30 grams of anhydrous ethanol. The nozzle and valve assembly fitted to the can which was then tested for leaks and allowed to warm to room temperature.

The aerosol was sprayed on a glass plate. Almost immediately the material dried to a clear, flexible film, which was not tacky. When the aerosol was sprayed on the hair and allowed to dry the film gave the hair a pleasing tack-free appearance and retained the shape of the hair which it had been while being sprayed.

*Example IV*

30 parts by weight of polyvinyl imidazole having a molecular weight of 40,000 were dissolved in 1000 parts of anhydrous ethanol. The alcoholic solution was filtered and the filtrate chilled below room temperature. To 40 parts by volume of the alcoholic solution there were added 60 parts by volume of an equal mixture of "Freon"–11 and "Freon"–12 in a suitable aerosol-type container under load conditions normally employed in the aerosol industry. When the aerosol was sprayed on the hair, it gave a glossy, resilient film which was completely tack-free.

*Example V*

Into a metal aerosol can partially submerged in a solid carbon dioxide/acetone bath were condensed 40 parts by weight of "Freon"-12 and 40 parts of "Freon"-11. To this was then added 20 parts by weight of a 10% anhydrous alcoholic solution of polyvinyl imidazole having a molecular weight of 32,000. A nozzle and valve assembly were attached in the usual manner and the can checked for leakage by submerging in water. The aerosol can was allowed to reach room temperature and glass panels sprayed to give a uniform coating. After drying at room temperature the films were observed to be odor free, clear and extremely flexible and glossy. The aerosol preparation was then employed to spray the hair and allowed to dry. The film resulting on the hair was very glossy, showed a pleasing appearance and retained the shape and condition that the hair was held in by being sprayed. Immediately following 45 seconds the hair was touched and no tack was perceptible. The film was readily removed by a simple soap and water washing.

The unusual feature of the polyvinyl imidazole is that while yielding high glossy, elastic, durable films that are resistant to conditions of relatively high humidity and are tack-free thereat, the films are readily removed by a simple soap and water washing. Thus it becomes clearly manifest that polyvinyl imidazole is the only polymeric material so far discovered that possesses this unique lack of hygroscopicity in the film state.

I claim:

1. A tack-free hair grooming composition comprising polyvinyl imidazole having a molecular weight of from 20,000 to 400,000 in solution of a low boiling aliphatic anhydrous alcohol and at least one aerosol propellant selected from the class consisting of chloro-fluorohydrocarbons of the methane and ethane series.

2. A tack-free hair grooming composition comprising 1 to 3 parts by weight of polyvinyl imidazole having a molecular weight of from 20,000 to 400,000 in solution with 25–35 parts by weight of an anhydrous low boiling aliphatic alcohol and 62–74 parts by weight of at least one aerosol propellant selected from the class consisting of chloro-fluorohydrocarbons of the methane and ethane series.

3. A tack-free hair grooming composition comprising 40 parts by weight of a 3% by weight solution in anhydrous ethanol of polyvinyl imidazole having a molecular weight of 40,000 and 60 parts by weight of an aerosol propellant selected from the class consisting of trichloromonofluoromethane and dichlorodifluoromethane.

4. A tack-free hair grooming composition comprising 1.5 parts by weight of polyvinyl imidazole having a molecular weight of 60,000 dissolved in 30 parts by weight of anhydrous ethanol, 40 parts by weight of dichlorodifluoromethane and 28.5 parts by weight of trichloromonofluoromethane.

5. A tack-free hair grooming composition comprising 20 parts by weight of a 10% anhydrous ethanol solution of polyvinyl imidazole having a molecular weight of 32,000, 40 parts by weight of dichlorodifluoromethane and 40 parts by weight of trichloromonofluoromethane.

References Cited in the file of this patent

UNITED STATES PATENTS

| | | |
|---|---|---|
| 2,643,990 | Ham | June 30, 1953 |
| 2,871,161 | Spiegel | Jan. 27, 1959 |